(12) United States Patent
Ohkubo et al.

(10) Patent No.: US 7,729,395 B2
(45) Date of Patent: *Jun. 1, 2010

(54) WAVELENGTH CONVERSION MODULE

(75) Inventors: Michio Ohkubo, Chiyoda-ku (JP); Hiroshi Matsuura, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/944,540

(22) Filed: Nov. 23, 2007

(65) Prior Publication Data

US 2008/0175283 A1 Jul. 24, 2008

Related U.S. Application Data

(63) Continuation of application No. 11/075,912, filed on Mar. 10, 2005, now Pat. No. 7,327,768, which is a continuation of application No. PCT/JP03/11549, filed on Sep. 10, 2003.

(30) Foreign Application Priority Data

Sep. 10, 2002 (JP) .............................. 2002-264733

(51) Int. Cl.
H01S 3/10 (2006.01)
H01S 3/04 (2006.01)

(52) U.S. Cl. .............................. 372/21; 372/22; 372/36

(58) Field of Classification Search ............. 372/21–22, 372/6, 36
See application file for complete search history.

(56) References Cited

U.S. PATENT DOCUMENTS

| 5,265,115 | A | 11/1993 | Amano |
| 5,341,388 | A | 8/1994 | Masuda et al. |
| 5,644,584 | A | 7/1997 | Nam et al. |
| 5,796,902 | A | 8/1998 | Bhat et al. |
| 5,838,709 | A | 11/1998 | Owa |
| 5,991,490 | A | 11/1999 | Mizuuchi et al. |
| 6,014,249 | A * | 1/2000 | Fermann et al. .......... 359/341.1 |
| 6,229,828 | B1 * | 5/2001 | Sanders et al. ................ 372/22 |
| 6,301,271 | B1 | 10/2001 | Sanders et al. |
| 6,301,273 | B1 * | 10/2001 | Sanders et al. ................. 372/6 |
| 6,324,203 | B1 | 11/2001 | Owa |
| 6,845,113 | B2 | 1/2005 | Kitaoka et al. |
| 6,876,689 | B2 | 4/2005 | Walling et al. |
| 7,327,768 | B2 * | 2/2008 | Ohkubo et al. ................ 372/21 |
| 2002/0176472 | A1 | 11/2002 | Arbore et al. |
| 2003/0112835 | A1 | 6/2003 | Williams et al. |

FOREIGN PATENT DOCUMENTS

| JP | 05-333395 | 12/1993 |
| JP | 06-281980 | 10/1994 |
| JP | 07-092514 | 4/1995 |
| JP | 7-92514 A | 4/1995 |
| JP | 10-186424 | 7/1998 |
| JP | 11-163451 | 6/1999 |
| JP | 11-509933 | 8/1999 |
| JP | 2000-250083 | 9/2000 |
| JP | 2000-250083 A | 9/2000 |
| WO | WO 96/38757 | 12/1996 |

* cited by examiner

*Primary Examiner*—Minsun Harvey
*Assistant Examiner*—Phillip Nguyen
(74) *Attorney, Agent, or Firm*—Oblon, Spivak, McClelland, Maier & Neustadt, L.L.P.

(57) ABSTRACT

A wavelength conversion module according to the present invention includes an external resonator, a semiconductor laser module and a wavelength conversion device for converting a wavelength of light output from the semiconductor laser module into a shorter wavelength. This wavelength conversion device includes at least one of a nonlinear crystal for generating SFG (Sum-frequency Generation) light and a nonlinear crystal for generating SHG (Second Harmonic Generation) light. Each of the SFG generating element and the SHG generating element of the wavelength conversion device may have a periodically-poled ridge-waveguide structure or a periodically-poled proton-exchanged-waveguide structure.

3 Claims, 16 Drawing Sheets

Fig.15
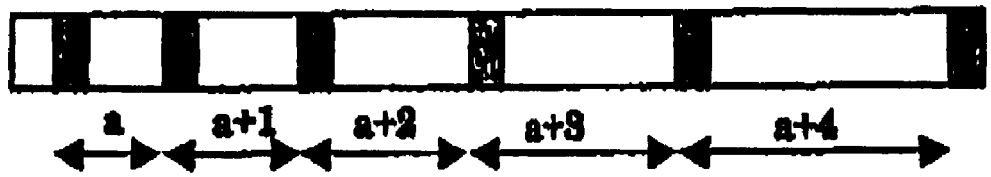
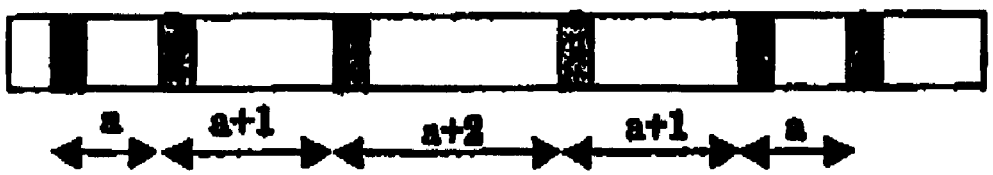
Fig.16
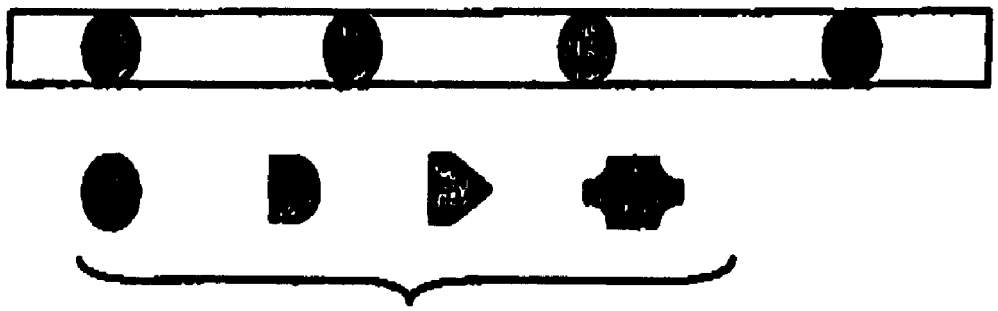
Shapes that can be created by photo mask
Fig.17

488 power monitor feedback control
non-FBG 488 nm blue laser system

Comparison of calculation values with experimental values

WAVELENGTH CONVERSION MODULE

CROSS-REFERENCE TO RELATED APPLICATIONS

This application is a continuation application of U.S. Ser. No. 11/075,912, filed Mar. 10, 2005, now allowed, which is a continuation application of International Application Serial No. PCT/JP2003/11549, filed Sep. 10, 2003 and claims the benefit of priority from Japanese Patent Application No. 2002-264733, filed Sep. 10, 2002, the entire contents of each of which are incorporated herein by reference.

TECHNICAL FIELD

The present invention relates to stabilization of intensity of light output from an SHG (Second Harmonic Generation) laser module and an SFG (Sum-frequency Generation) laser module.

BACKGROUND ART

Light output from a GaAs semiconductor laser has a wavelength which covers from around 1 μm to the 600 nm range, while a GaN semiconductor laser has been developed to output light with a wavelength of 405 nm mainly for use of next generation DVD light source. Well known as a laser of wavelength between them, that is, between about 400 nm and the 600 nm range are an Ar laser (488 nm/515 nm) and a combination of YAG/YLF and SHG (532 nm), for example.

The combination of YAG/YLF and SHG (532 nm) is developed for high power use (W level) and the YAG/YLF and SHG market is rapidly expanded in the fields of a marker of Si board or the like and trimming or repairing of TFT liquid crystal. Particularly, since a "marker" is now in increasing demand because of expanding demand for CSP (Chip Size Package) to be implemented in a mobile device, application of particularly YAG combined SHG laser module thereto is becoming active.

Further, in the trimming and repairing area, demands for repairing a display defect of TFT liquid crystal display are rapidly increased against the backdrop of increased production of TFT liquid crystal displays.

On the other hand, as a low power use, it is applied to measuring instrument, printing devices, DNA analyzers and the like.

FIG. 4 shows a conventional structure of an SHG blue (oscillation wavelength of 473 nm) or green (oscillation wavelength of 532 nm) laser module (for example, refer to "The Review of Laser Engineering" December 1998, pp 861 to 866).

A blue wavelength conversion SHG laser module 25 utilizes as a laser crystal a YAG crystal 21 and as a pumping light source a wide-stripe semiconductor laser device 5 of emission width 50 μm and maximum output 500 mW.

Semiconductor laser light output from the above-mentioned semiconductor laser device 5 is gathered inside the YAG crystal 21 via a lens 20 to initiate laser oscillation with the fundamental of wavelength 946 nm from the YAG crystal 21. Then, an SHG device (PPMGLN: Periodically poled MgO—LiNdO$_3$ crystal) 22 converts the wavelength to output wavelength converted blue light of wavelength 473 nm, which then passes through an etalon 23 and a mirror 24 to be output.

However, the above-described conventional technique has a problem such that the YAG crystal 21 is heated when the fundamental is emitted by laser oscillation and the wavelength of light emitted from the YAG crystal 21 is shifted from the set wavelength. When the wavelength is shifted, an output from the SHG laser module becomes unstable.

In addition, as the biotechniques including fluorescence microscope and fluorescence analyses have been developed, there are demands for an inexpensive visible light (400 nm to 532 nm) laser for fluorescence excitation. However, its suitable laser module has not been realized yet.

SUMMARY OF INVENTION

It is an object of the present invention to provide an SHG laser module with stable outputs or an SHG laser module which can cause constant change in outputs. Another object is to provide a low-cost visible light (400 nm to 532 nm) laser module for fluorescence excitation.

In order to solve the above mentioned problems, a first aspect of a wavelength conversion module of the present invention is a wavelength conversion module comprising: an external resonator; a semiconductor laser module; and a wavelength conversion device for converting a wavelength of light output from said semiconductor laser module into a shorter wavelength than the wavelength of the light.

Another aspect of the wavelength conversion module is a wavelength conversion module in which the aforementioned wavelength conversion device includes at least one of a non-linear crystal for generating SFG (Sum-frequency Generation) light and a nonlinear crystal for generating SHG (Second Harmonic Generation) light.

Another aspect of the wavelength conversion module is a wavelength conversion module in which each of the nonlinear crystal for generating SFG light and the nonlinear crystal for generating SHG light of said wavelength conversion device has a periodically poled ridge waveguide structure.

Another aspect of the wavelength conversion module is a wavelength conversion module in which each of the nonlinear crystal for generating SFG light and the nonlinear crystal for generating SHG light of said wavelength conversion device has a periodically poled proton exchanged waveguide structure.

Another aspect of the wavelength conversion module is a wavelength conversion module in which the aforementioned semiconductor laser module and the aforementioned wavelength conversion device are coupled by an optical fiber.

Another aspect of the wavelength conversion module is a wavelength conversion module in which the aforementioned external resonator is provided at a part of the optical fiber.

Another aspect of the wavelength conversion module is a wavelength conversion module in which the optical fiber is a polarization maintaining fiber.

Another aspect of the wavelength conversion module is a wavelength conversion module in which light output from the aforementioned wavelength conversion module has a wavelength ranging from 160 nm to 1,620 nm.

Another aspect of the wavelength conversion module is a wavelength conversion module in which light output from the aforementioned wavelength conversion device is input to a second optical fiber.

Another aspect of the wavelength conversion module is a wavelength conversion module in which a spectral width of light output from the aforementioned semiconductor laser module is wider than 0.5 MHz and has one or more longitudinal modes.

Another aspect of the wavelength conversion module is a wavelength conversion module in which the aforementioned wavelength conversion device has a chirped grating period structure.

Another aspect of the wavelength conversion module is a wavelength conversion module in which the aforementioned wavelength conversion device and the optical fiber is connected by batting with no lens provided between the wavelength conversion device and the optical fiber.

BRIEF DESCRIPTION OF DRAWINGS

FIG. 15 is a view illustrating an example of photo mask design for a PPLN with a chirped grating period;

FIG. 16 is a view illustrating an example of photo mask design used when periodic gradient is made;

FIG. 17 is a view illustrating a waveguide with polarization fabricated by applying a high voltage at a high temperature;

BEST MODE FOR CARRYING OUT THE INVENTION

First Embodiment

In a first embodiment, EBG is used as an external resonator in order to stabilize an oscillation wavelength of a semiconductor laser module.

Figure 1:
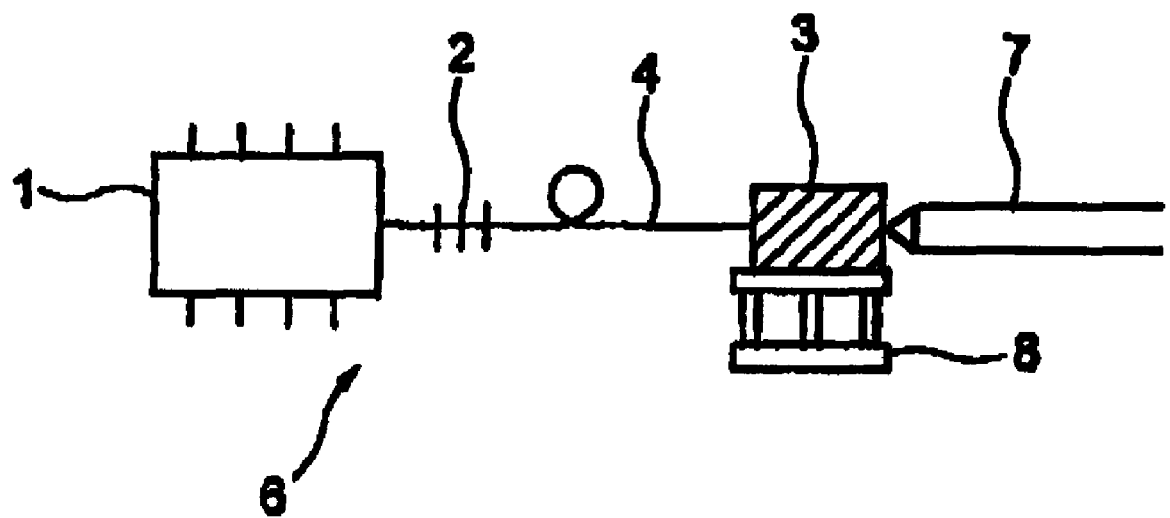
FIG. 1 is a view illustrating an SHG laser module according to a first embodiment of the present invention.

FIG. 1 shows a wavelength conversion laser module 6 according to the embodiment of the present invention. A semiconductor laser module 1 and a wavelength conversion device 3 are coupled by a polarization maintaining optical fiber 4 which has a FBG 2. A wavelength of light output from the semiconductor laser module 1 is fixed at one longitudinal mode by the FBG 2.

In order to change an output from the wavelength conversion laser module 6, a driving current of the semiconductor laser module 1 is changed. Even when the driving current is changed, the wavelength is not shifted since the wavelength is fixed by the FBG 2. Accordingly, it is possible to achieve stable change in an output from the wavelength conversion laser module 6.

Since the wavelength conversion device 3 has polarization dependence, a polarization maintaining optical fiber is preferably used as an optical fiber 4.

In order to stabilize an SHG output from the wavelength conversion device (SHG device) 3, the temperature thereof is preferably adjusted by a Peltier element 8.

Light output from the wavelength conversion device 3 is input to a short-wavelength single mode optical fiber 7. The single mode optical fiber 7 enables light output from the wavelength conversion device 3 to be propagated effectively. For a use of power transmission, the optical fiber into which light from the wavelength conversion device 3 is input may be a multi mode optical fiber instead of a single mode fiber.

EXAMPLE 1

Figure 2:
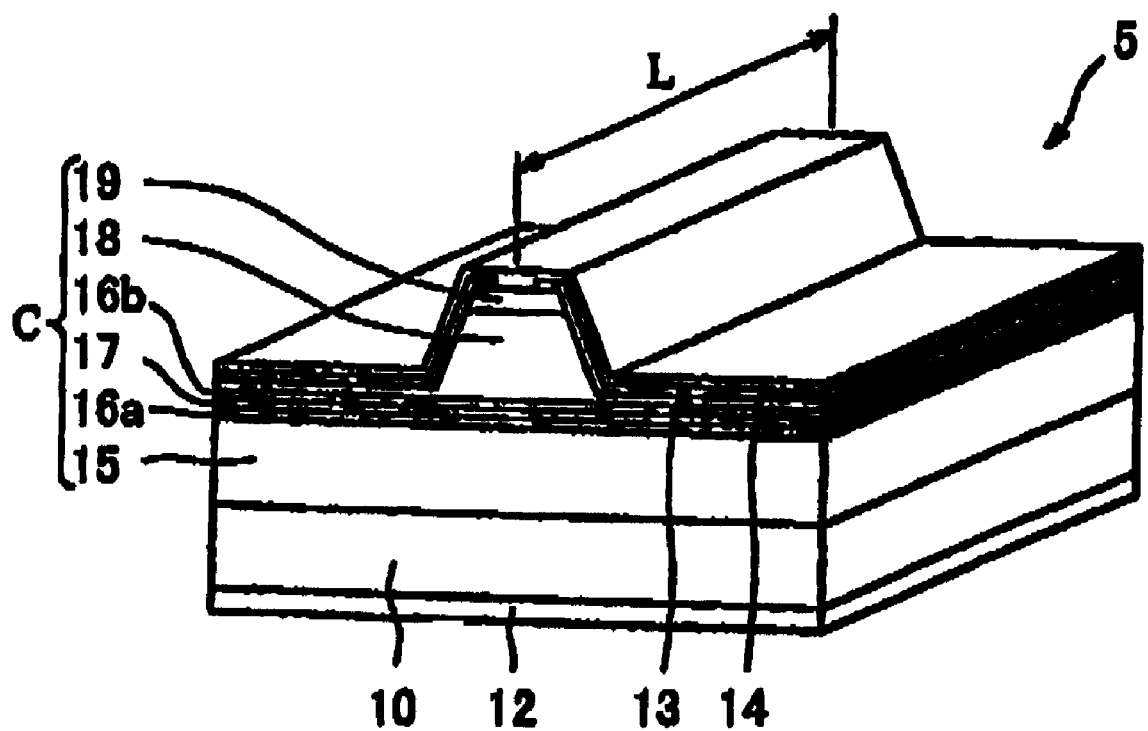
FIG. 2 is a view illustrating a structure of a semiconductor laser element of an example 1.

FIG. 2 shows a semiconductor laser element 5 used in the example 1. The semiconductor laser element 5 is structured by laminating on a GaAs substrate 10 a lower cladding layer 15 of AlGaAs, a lower GRIN-SCH layer 16a of AlGaAs, an active layer 17 having a quantum well structure, an upper GRIN-SCH layer 16b of AlGaAs, a upper cladding layer 18 of AlGaAs, and a cap layer 19. The symbol 12 depicts a lower electrode and the symbol 14 depicts an upper electrode. A well layer of the quantum well active layer 17 is made of InGaAs.

The wavelength of light output from the semiconductor laser element 5 was 976 nm. This semiconductor laser element 5 is incorporated in the semiconductor laser module 1 shown in FIG. 1 to build the wavelength conversion laser module 6.

The wavelength of light output from the wavelength conversion device 3, or the wavelength of light output from the wavelength conversion laser module 6, was 488 nm.

EXAMPLE 2

The semiconductor laser element 5 of the example 2 is structured in the same way as that of the example 1 except that the In composition of the well layer material InGaA is changed. The wavelength of light output from the semiconductor laser element 5 was 1,064 nm.

The wavelength conversion laser module 6 of the example 2 has the same structure as that of the example 1. The wavelength of light output from the wavelength conversion device (SHG device) 3, or the wavelength of light output from the wavelength conversion laser module 6, was 532 nm.

EXAMPLE 3

The semiconductor laser element 5 of the example 3 is structured in the same way as that of the example 1 except that a material of the well layer is changed into AlGaAs. The wavelength of light output from the semiconductor laser element 5 of the example 3 was 810 nm.

The wavelength conversion laser module 6 of the example 3 has the same structure as that of the example 1. The wavelength of light output from the wavelength conversion device (SHG device) 3, or the wavelength of light output from the wavelength conversion laser module 6, was 405 nm.

Accordingly, the wavelength of light output from the semiconductor laser element 5 can be set at any wavelength within the range of between 800 nm and 1,200 nm by changing the material or the composition of the well layer.

Further, appropriate designing of the FBG 2 makes it possible to change the wavelength of light input to the wavelength conversion device 3 arbitrarily.

Figure 3:
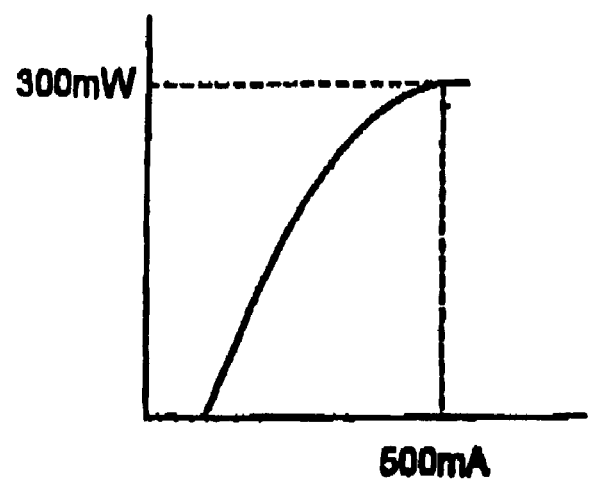
FIG. 3 is a view showing current-light output property of the semiconductor laser element of the example 1.
Figure 4:
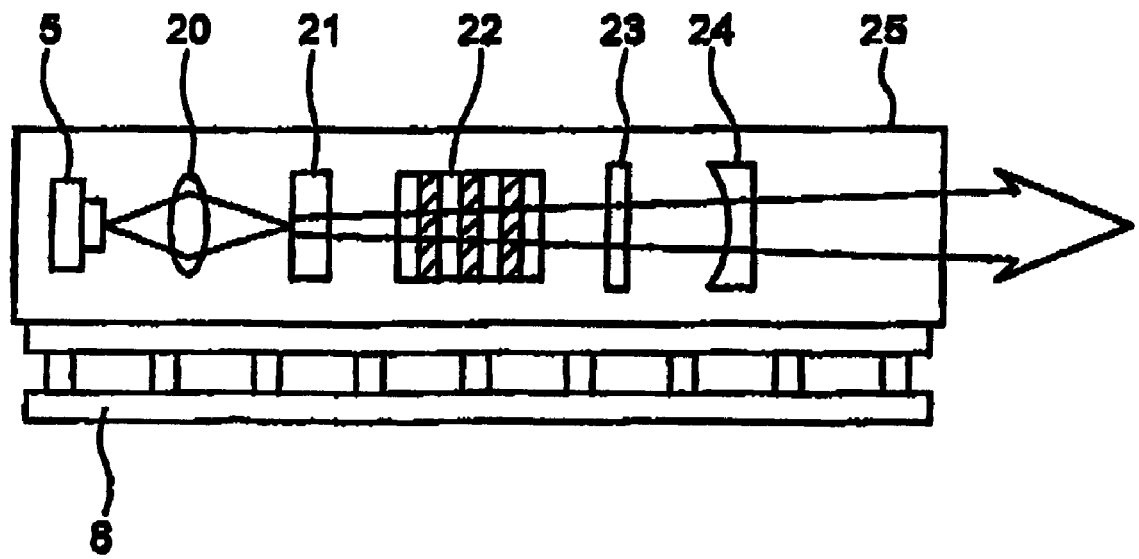
FIG. 4 is a view illustrating a conventional SHG laser module.

FIG. 3 shows the current-output property of the semiconductor laser element 5 used in the example 1. When the driving current is 500 mA, the optical output is 300 mW. In the related art shown in FIG. 4, an output of the semiconductor laser element 5 is 500 mW, an output of the YAG crystal 21 is a few mW and an input to the wavelength conversion device 22 is a few mW. On the other hand, according to the present invention, since high-power output light shown in FIG. 3 can be directly input to the wavelength conversion device 3, it is possible to achieve excellent energy conversion efficiency of the wavelength conversion laser module 6 from the input power.

Second Embodiment

Figure 5:
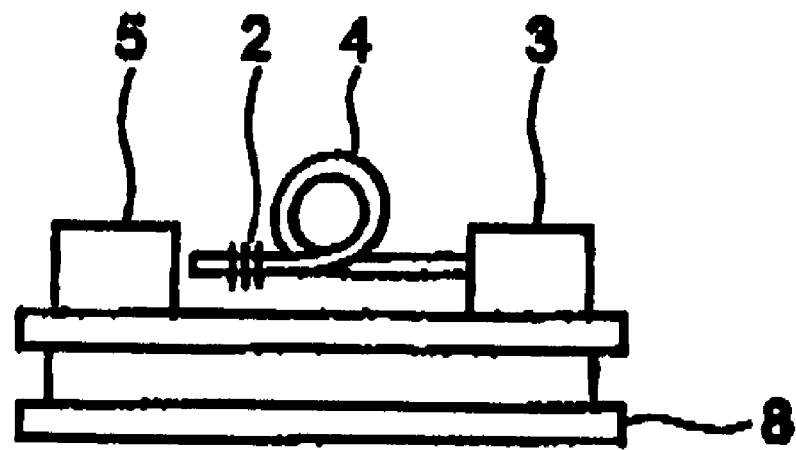
FIG. 5 is a view illustrating an SHG laser module according to a second embodiment of the present invention.

FIG. 5 shows the second embodiment. The semiconductor laser element 5 and the wavelength conversion device 3 are mounted on a temperature-controlling peltier element 8. With this configuration, the temperatures of both of the semiconductor laser element 5 and the wavelength conversion device 3 can be controlled at the same time by the peltier element 8, and input power to the peltier element 8 can be reduced.

Third Embodiment

Figure 6:
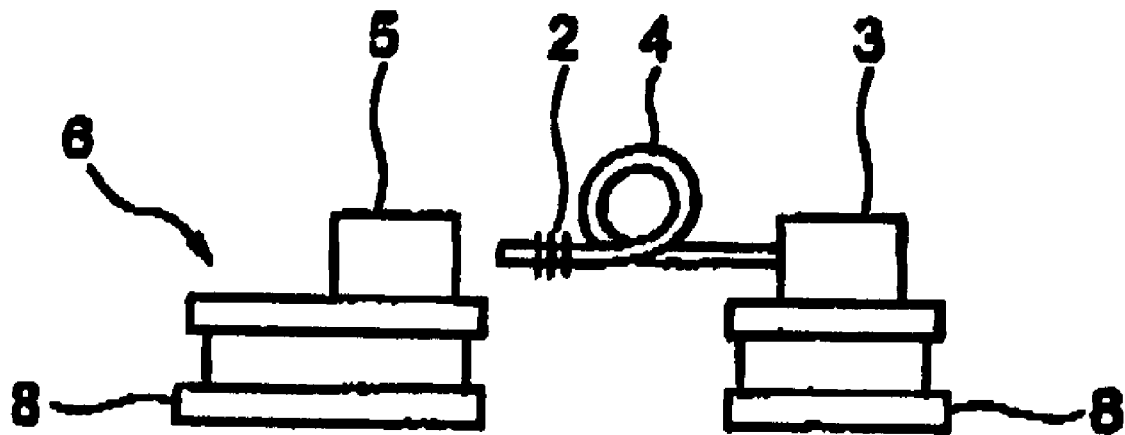
FIG. 6 is a view illustrating an SHG laser module according to a third embodiment of the present invention.

FIG. 6 shows the third embodiment. A wavelength conversion laser module 6 of this embodiment includes a peltier element 8 for the semiconductor laser element 5 and a peltier element 8 for the wavelength conversion device. With this configuration, since the temperature of the semiconductor laser element 5 and the temperature of the wavelength conversion device 3 are controlled separately, an output from the wavelength conversion laser module 6 is more stabilized.

Other Embodiments

Other embodiments of a laser module will be described below.

Figure 7:
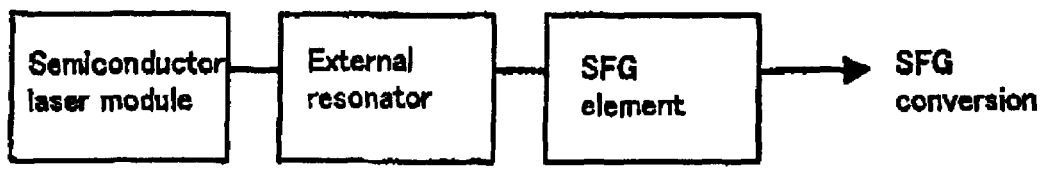
FIG. 7 is a view illustrating a wavelength multiplying module including an external resonator, a semiconductor laser module and an SFG element.

FIG. 7 shows a wavelength multiplying module including an external resonator, a semiconductor laser module and a nonlinear crystal for generating SFG light by converting a wavelength of light from the semiconductor laser module into a shorter wavelength.

The semiconductor laser for bringing about SFG conversion here is a light source which has a spectral width of more than 0.5 MHz and one or more longitudinal modes. However, when there are two or more longitudinal modes, the space of the longitudinal modes can be determined arbitrarily. When the spectral width is smaller than 0.5 MHz and there is one longitudinal mode, the width of SFG conversion and the width of SHG conversion are the same. In addition, the light source of the present invention is not limited to that of the semiconductor laser.

The SFG element is a nonlinear optical crystal made of LN, KN, BBO or the like. In order to generate SFG light by Quasi Phase Matching, the nonlinear crystal has a periodically poled structure.

Figure 8:
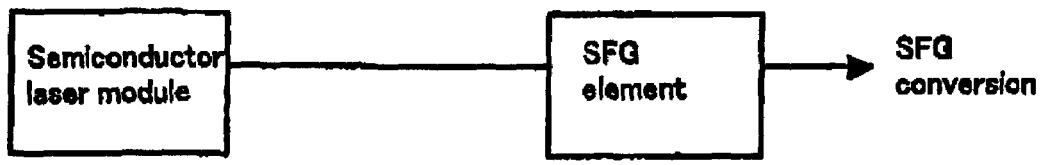
FIG. 8 is a view illustrating a wavelength multiplying module including a semiconductor laser module and an SFG generating element.

FIG. 8 shows a wavelength conversion module including a semiconductor laser module and a nonlinear crystal for generating SFG light by converting a wavelength of light output from the semiconductor laser module into a shorter wavelength. The semiconductor laser module and the SFG element used in this embodiment are principally the same as those used in the embodiment shown on FIG. 7.

Figure 9:
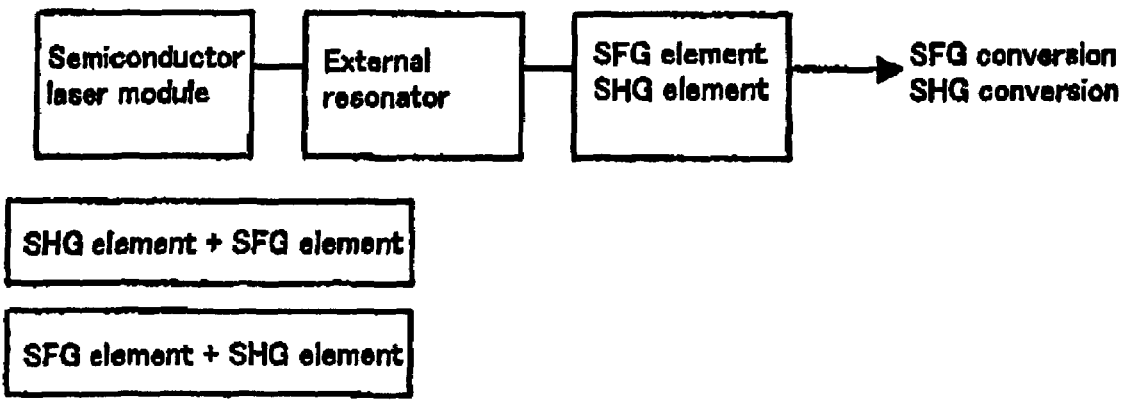
FIG. 9 is a view illustrating a wavelength multiplying module including an external resonator, a semiconductor laser module, an SFG generating element and an SHG generating element.

FIG. 9 shows a wavelength multiplying module including an external resonator, a semiconductor laser module and a nonlinear crystal which has an SFG element and an SHG element for converting a wavelength of light output from the semiconductor laser module into a shorter wavelength. As shown in FIG. 9, combination of the elements can be "SHG element+SFG element" or "SFG element+SHG element". The semiconductor laser module and the SFG and SHG elements used in this embodiment are principally the same as those used in the embodiment on FIG. 7.

Figure 10:
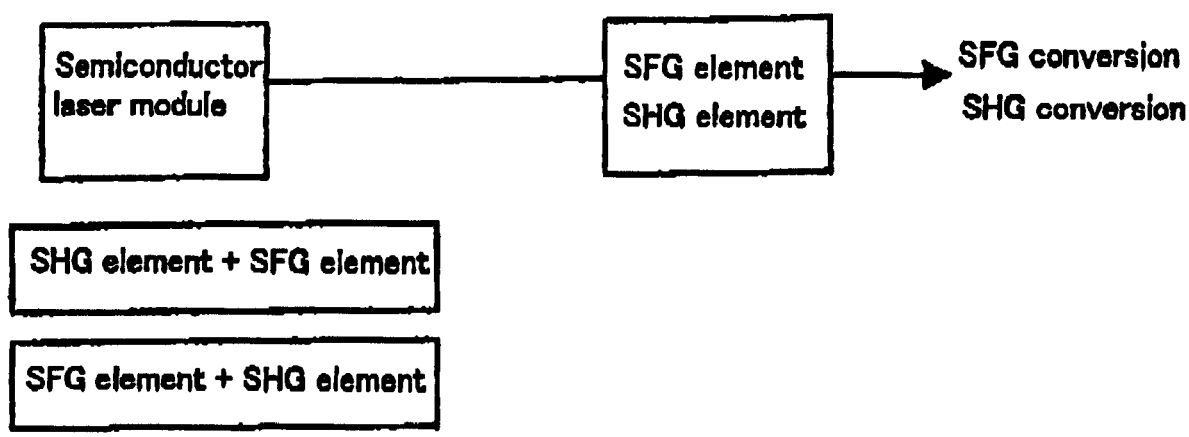
FIG. 10 is a view illustrating a wavelength multiplying module including a semiconductor laser module and an SFG generating element and an SHG generating element.

FIG. 10 shows a wavelength conversion module including a semiconductor laser module and a nonlinear crystal which has an SFG element and an SHG element for converting a wavelength of light output from the semiconductor laser module into a shorter wavelength. As shown in FIG. 10, combination of the elements can be "SHG element+SFG element" or "SFG element+SHG element". The semiconductor laser module and the SFG and SHG elements used in this embodiment are principally the same as those used in the embodiment on FIG. 7.

Figure 11:
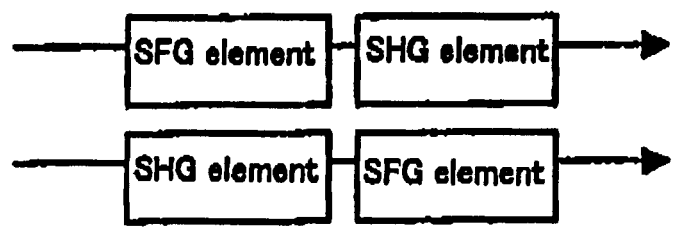
FIG. 11 is a view showing that an SFG element and an SHG element are coupled by an optical fiber.

The aforementioned semiconductor laser module, the SFG element and the SHG element can exert given effects as a wavelength conversion module when they are optically coupled by an optical fiber. As shown in FIG. 11, the SFG element and the SHG element are also coupled by an optical fiber.

In another embodiment, the above-described external resonator may be provided at a part of an optical fiber. The external resonator may be a Fiber Bragg Grating type resonator, a resonator formed by imbedding a filter in a groove inside the fiber, a resonator formed by attaching a filter to an end face of the fiber, a resonator formed by inserting a filter in a lens arranged between fibers, or the like.

Figure 12:
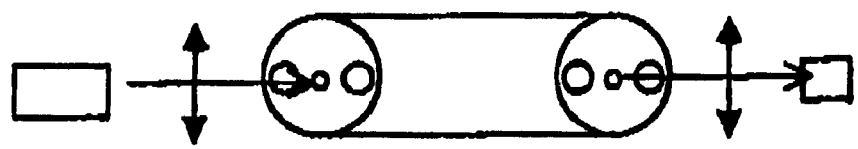
FIG. 12 is a view showing a case when an optical fiber a polarization maintaining single mode fiber.

FIG. 12 shows a polarization maintaining single mode fiber used as the aforementioned optical fiber. In order to maintain the polarization direction of light output from a laser, the polarization maintaining direction of the polarization maintaining fiber is matched with the polarization direction of the light from the laser. The matched direction can be further matched with the axial direction for maximizing a degree of conversion efficiency of the SHG+SFG element crystal or the SHG+SFG element crystal provided next to the semiconductor laser module.

Further, used as the wavelength of the output light from the wavelength multiplying module can be a transmission wavelength of the SFG crystal. In this case, an LD and DBR laser of 1,064 nm or less is chiefly used for the fundamental wave.

Figure 13:
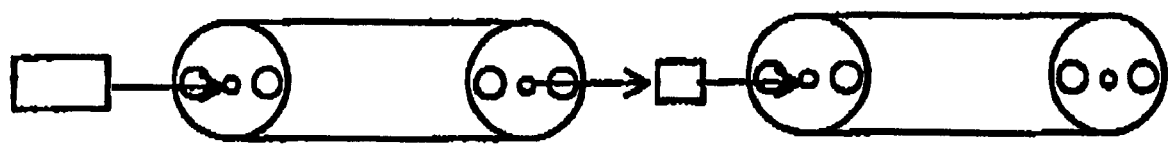
FIG. 13 is a view illustrating light output from a wavelength multiplying module being input to a second fiber.

FIG. 13 shows light output from the aforementioned wavelength multiplying module being input into a second fiber.

Figure 14:
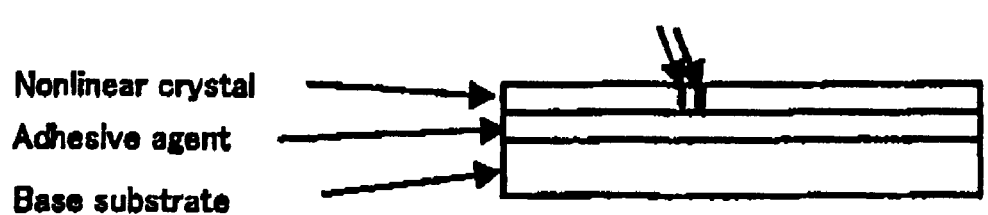
FIG. 14 is a view illustrating an SFG generating element which has a periodically poled ridge waveguide structure.

FIG. 14 shows an embodiment in which the SFG device has a periodically poled ridge waveguide structure. As shown in FIG. 14, this element has a structure made of a thinly polished nonlinear crystal, an adhesive agent (organic or inorganic) and a base substrate (nonlinear crystal, or silicon, glass or crystal which has the similar level of linear expansion factor).

Light output from the aforementioned wavelength conversion module according to the present invention has wavelength ranging from the minimum transmission wavelength 160 nm of a LBO crystal to the maximum wavelength 1,620 nm of an L band for communication that is subjected to wavelength conversion.

Next description is made about PPLN (Periodically Poled LiNbO3) that is a wavelength multiplying element. The periodically poling of the PPLN is fixed and a wavelength to be converted depends on the period. Accordingly, in order to achieve efficient wavelength conversion, it is important to make the period uniform. However, tolerances of wavelengths and temperature become very strict. Since there are influences of mode hopping of light source, PPLN linear expansion factor and refractive index temperature factor, use of PPLN requires extremely fine control. Then, as practically there occurs no problem even if the conversion efficiency is a little lowered, the tolerances of the temperature and wavelength can be relaxed. On this account, variation is introduced in the poled domain grating periods.

There are the following three ways for bringing about variation in poled domain grating periods. The first way is that the PPLN has a chirped grating period structure. Period-chirped masking is performed and for example, photo masking design shown in FIG. 15 can be performed.

Further, periodic gradient can be performed. For example, photomask designing can be performed as shown in FIG. 16. Furthermore, poling may be provided in a waveguide. A condition for poling is set by applying high voltage at a high temperature and thereby, poling as shown in FIG. 17 can be caused in an actual waveguide.

Next description is made about coupling of a PPLN that is a wavelength conversion element and an optical fiber. There are two coupling structures, one structure with no lens used, which is shown in Table 1, and the other with lenses used which is shown in Table 2.

TABLE 1

Structure with no lens

| Input-side optical fiber | crystal | output-side optical fiber |
|---|---|---|
| PMF (the input-side PMF axis is fixed to agree with the crystal axis) WAR or AR coating for both-side fundamental wave and SH wave | PPLN (6 mm bevel at the angle ranging from 4 to 10 degree, WAR or AR coating for both-side fundamental wave and SH wave is indispensable) | PMF (the output-side PMF axis is fixed to agree with the crystal axis) WAR or AR coating for both-side fundamental wave and SH wave SMF (agreement between the output-side PMF axis and the crystal axis is not required) WAR or AR coating for both-side fundamental wave and SH wave MMF (agreement between the output-side PMF axis and the crystal axis is not required) WAR or AR coating for both-side fundamental wave and SH wave |

TABLE 2

Structure with lenses

| Input-side optical fiber | Lens | | crystal | lens | | output-side optical fiber |
|---|---|---|---|---|---|---|
| PMF (the input-side PMF axis is fixed to agree with the crystal axis) WAR coating for both-side fundamental wave and SH wave | Collimating lens (GRIN lens etc.) WAR coating for both-side fundamental wave and SH wave | Collective lens (GRIN lens etc.) WAR coating for both-side fundamental wave and SH wave | PPLN (6 mm level at the angle ranging from 4 to 10 degree, WAR coating for both-side fundamental wave and SH wave is indispensable) | Collimating lens (GRIN lens etc.) WAR coating for both-side fundamental wave and SH wave | Collective lens (GRIN lens etc.) WAR coating for both-side fundamental wave and SH wave | PMF (the output-side PMF axis is fixed to agree with the crystal axis) WAR coating for both-side fundamental wave and SH wave SMF (agreement between the output-side PMF axis and the crystal axis is not required) |

TABLE 2-continued

Structure with lenses

| Input-side optical fiber | Lens | crystal | lens | output-side optical fiber |
|---|---|---|---|---|
| | | | | WAR coating for both-side fundamental wave and SH wave MMF (agreement between the output-side PMF axis and the crystal axis is not required) WAR coating for both-side fundamental wave and SH wave |

When lens is not used, AR coating may be formed at least output side. The AR coating may be formed at the input side, if necessary. Furthermore, the AR coating may not be formed when each of the input face and output face is controlled. When lenses are used, an NA of an input fiber (angular aperture) and an NA of PPLN are measured and the focus distance f1 of a collimating lens and the focus distance f2 of a collective lens are selected in such a manner that the NA of the input fiber×f1 and f2×the NA of PPLN are matched. Likewise, an NA of an output fiber (angular aperture) and an NA of PPLN are measured and the focus distance f1 of a collective lens and the focus distance f2 of a collimating lens are selected in such a manner that the NA of the input fiber×f1 and f2×the NA of PPLN are matched. With this setting, since WAR coating (double AR coating) for fundamental wave and SH wave is adopted, a stable output is achieved. When AR coating is applied to fundamental wave and reflecting coating is applied to SH wave at the input side of the PPLN, while AR coating applied to SH wave and reflecting coating is applied to fundamental wave at the output side, then, the SH wave becomes significantly unstable.

Then, a way for fixing a PPLN as a wavelength conversion element is described. Although it is possible to form a groove in a PPLN, the PPLN is brittle and groove forming is difficult. Accordingly, a useful way is of connecting the wavelength multiplying element and the optical fiber by batting with no lens interposed therebetween. In addition, also possible is an embodiment such that the wavelength multiplying element and the optical fiber are connected via no lens by batting and no adhesive agent is used in the optical path.

Figure 18:
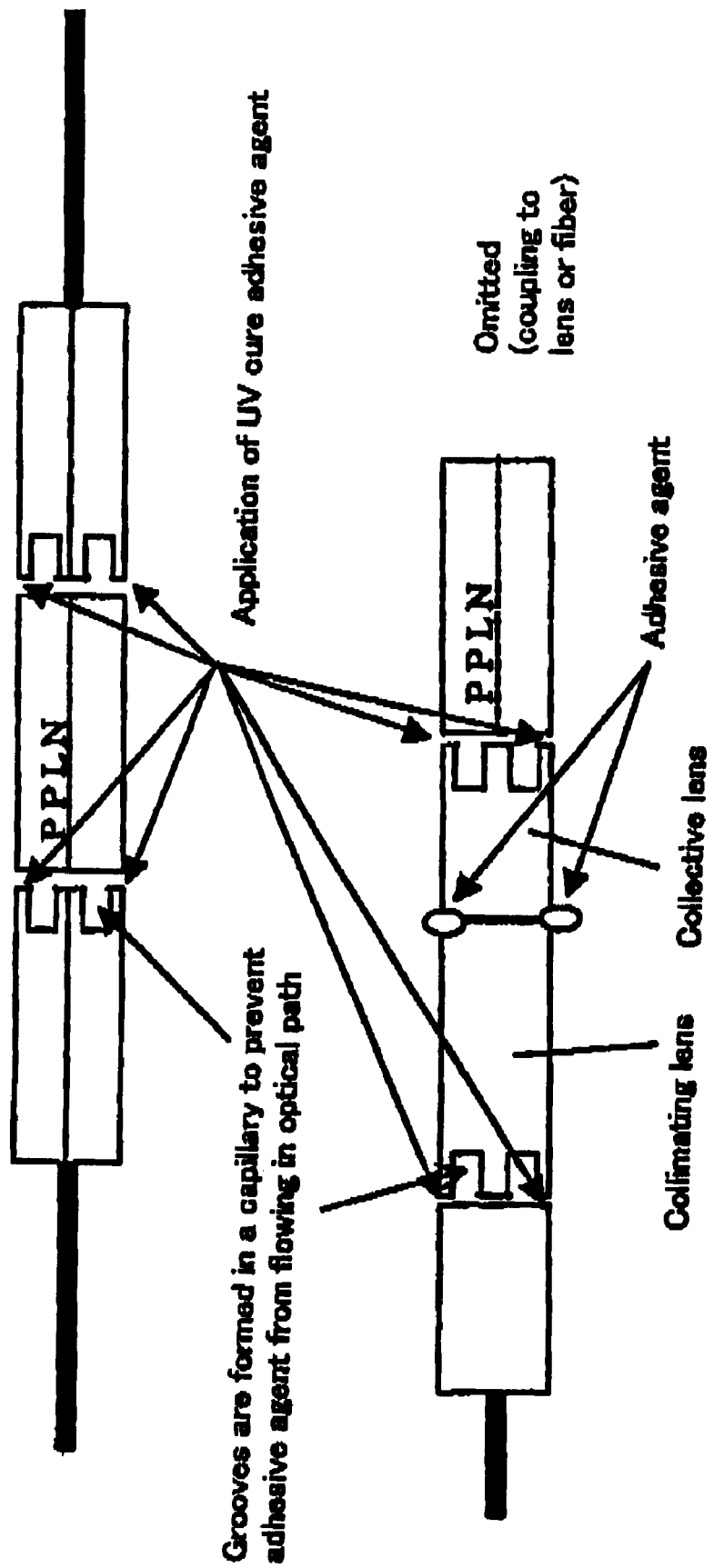
FIG. 18 is a view illustrating an embodiment where a PPLN is couplet to an optical fiber by an adhesive agent.

Next, FIG. 18 is used to show an embodiment where connection is carried out by using an adhesive agent. When no lens is used, connection is made by forming a groove in a capillary. On the other hand, when lenses are used, grooves are formed on the lenses. The adhesive agent is preferably a UV cure adhesive agent or a thermosetting adhesive agent.

When no lens is used, a capillary can be made of glass (quartz, borosilicate glass and so on), ceramics (zirconia and so on) or metal (SUS and so on). Particularly, when a UV cure adhesive agent is used, glass is better since ultraviolet light is allowed to pass through the glass.

When lenses are used, a collimate lens and a collective lens are fixed by using an adhesive agent. The aforementioned adhering way with use of a groove can be adopted unless it affects a collimated beam. Further, as another way, the inner circumference of a pipe and the outer circumference of a lens may be metalized to fix the pipe and the lens by soldering.

Example of Wavelength Multiplying Module

With use of a wavelength conversion module including a semiconductor module and a wavelength conversion element, its performance was demonstrated by experiments. Specifically, it is a blue laser including a 976 LD (semiconductor laser diode) and an SFG (Sum Frequency Generation) element made of PPLN (periodically Poled Lithium Niobate) and not FBG (Fiber Bragg Grating).

Then, we developed a 488 nm blue laser by combining a 976-nm multi-mode LD (Laser Diode) that is a pumping light source of an optical amplifier and the PPLN by quasi-phase matching.

In performing wavelength conversion with single-longitudinal-mode fundamental wave, calculation is carried out generally based on the SHG (Second Harmonic Generation) theory. Since the used fundamental wave is of a semiconductor laser for optical communication, it has a spectral width with full width at half maximum (FWHM) of approximately 1 nm and FBG is provided for wavelength locking. This proved that not only SHG light but also SFG light are emitted even for the spectral width of approximately 1 nm at FWHM. Next, we conducted simulation based on the SFG theory by using a 976 nm multi-mode LD without FBG and with the FWHM of approximately 5 nm and have confirmed that useful 488 nm output power can be achieved while preventing mismatching of phase matching condition by difference of the PPLN designed wavelength and the FBG locking wavelength.

Martin M. Fejer [1] etc. discloses SHG property including wavelengths and temperature and their tolerances on the QPM (Quasi Phase Matching) condition. However, their theory is based on calculation with fundamental wave of single mode and a narrower spectral width, and is not general theory. When fundamental wave with a wider spectral width is used, calculation is performed based on the SFG theory so that calculation results match experimental values. Incident light is divided into light of respective wavelengths ($\lambda_1$, $\lambda_2, \ldots, \lambda_n$) and the intensity of light of respective wavelengths is expressed as ($p_1, p_2, \ldots, p_n$). From the SFG principle, any wavelength $\lambda_i$ is combined with all wavelengths $\lambda_j$ to emit light with wavelength of $\lambda_k$.

$$1/\lambda_k = 1/\lambda_i + 1/\lambda_j \quad (1)$$

Figure 19:
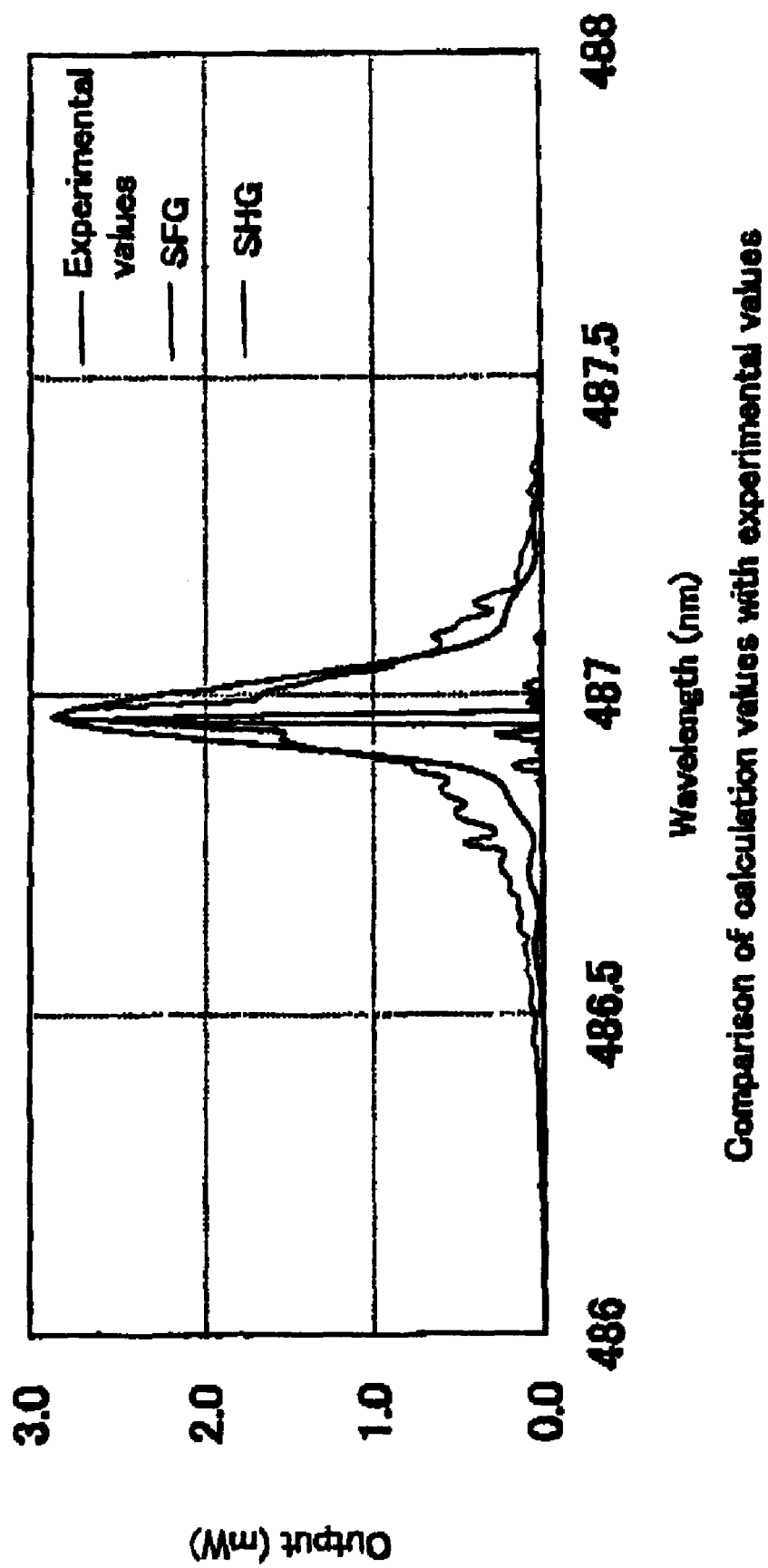
FIG. 19 is a view showing output waveforms obtained by calculation based on the SFG and SHG theory and experimental values.

The intensity of emitted light $\lambda_k$ is determined by the intensity $p_i$, $p_j$ of the fundamental wave $\lambda_i$, $\lambda_j$ and the phase matching condition Δs of the fundamental wave $\lambda_i$, $\lambda_j$. FIG. 19 shows an output spectrum obtained by calculation based on the SFG and SHG theories and experimental values. As compared with the spectrum of the experimental values (FWHM of 0.113 nm), the spectrum obtained by calculation based on the SHG theory presents a narrower FWHM of 0.003 nm, while the spectrum obtained by calculation based on the SFG theory presents a FWHM of 0.094 nm, which almost matches that of the experimental values.

When the LD without FBG is used for the fundamental wave, the following features are be given as compared with the LD with FBG.

1) Temperature of an LD chip is controlled to tune a wavelength to a design wavelength of the PPLN.
2) Components can be simplified; and
3) Although the peak power of the phase matching wavelength is reduced, since it is SFG, 488 nm output is not decreased much as compared with sink function.

Figure 20:
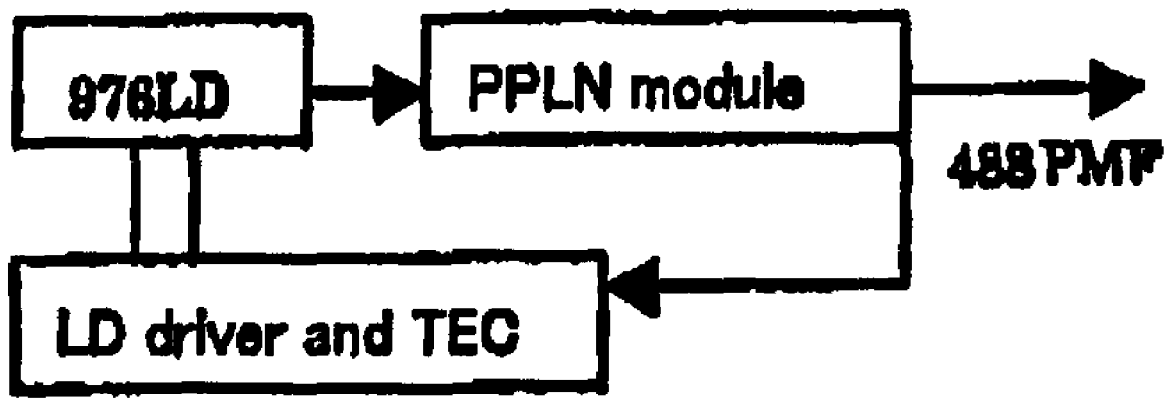
FIG. 20 is a view illustrating a configuration of a 488 nm blue laser without FBG.

FIG. 20 shows a configuration of 488 nm blue laser without FBG.

(Tuning)

Figure 21:
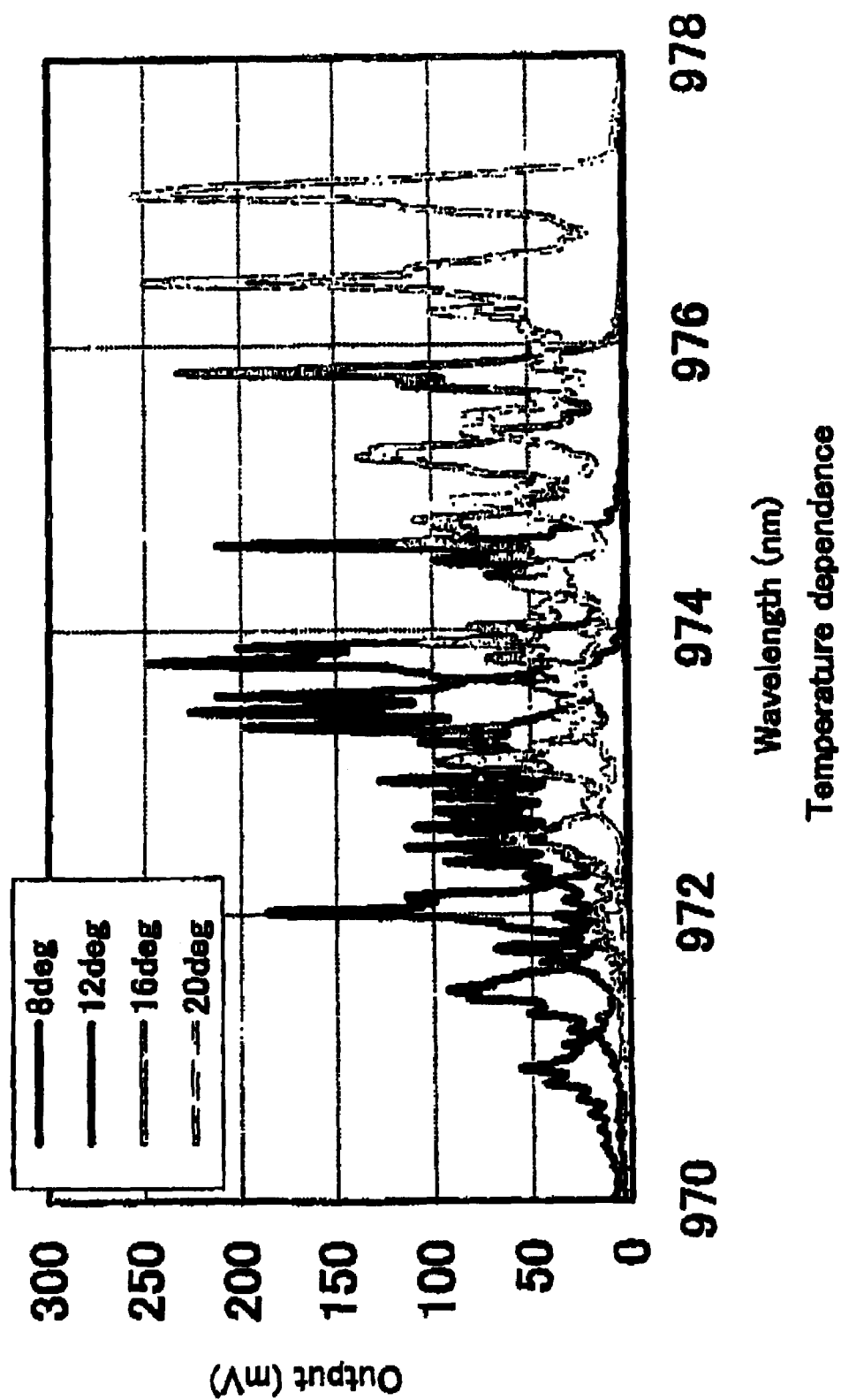
FIG. 21 is a view showing the temperature of an LD is controlled to tune an oscillation spectrum to a phase matching wavelength of a PPLN (fundamental wave)

The temperature of an LD is controlled to tune an oscillation spectrum to a phase matching wavelength (974 nm) of a PPLN (see FIG. 21), thereby enabling optimization of 488 nm output power. Since the fundamental wave is broadband, it is not necessary to control the temperature of the PPLN.

Figure 22:
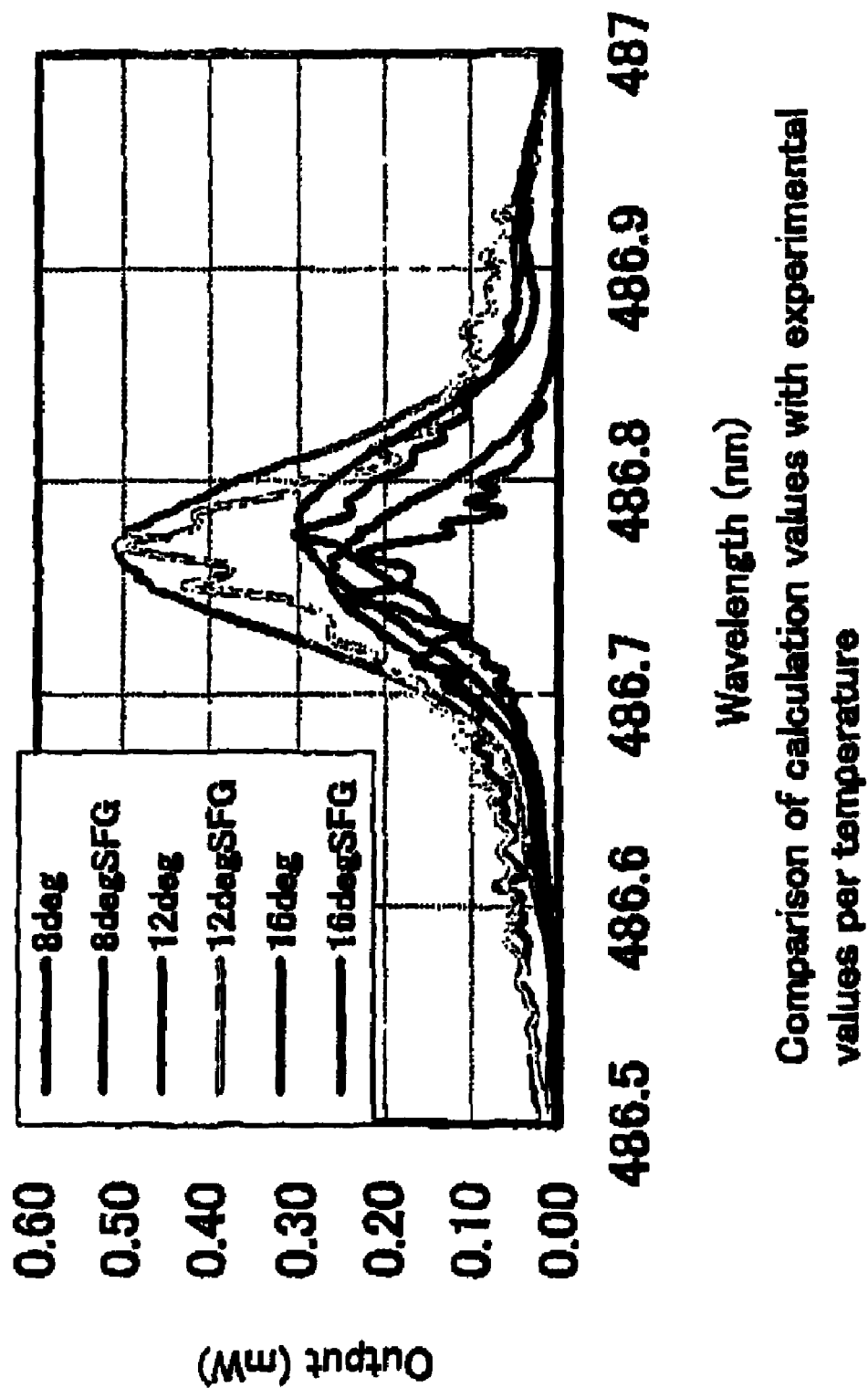
FIG. 22 is a view showing an output spectrum calculated from the fundamental shown in FIG. 21 based on the SFG theory and experimental values.

An output spectrum obtained by calculation from the fundamental wave (see FIG. 21) based on the SFG theory is compared with experimental data. Experimental results of 488 nm spectrum in FIG. 22 shows that temperature control of the LD enables tuning of 488 nm output power (optimal for 12 deg). In addition, the calculation results based on the SFG theory and the experimental values are almost identical in spectral shape and full width at half maximum (FWHM), which means that the SFG theory calculation is right.

TABLE 3

| | FWHM comparison | | |
|---|---|---|---|
| | LD temperature | | |
| | 8 deg | 12 deg | 16 deg |
| Experiment | 0.089 nm | 0.100 nm | 0.104 nm |
| SFG | 0.080 nm | 0.085 nm | 0.080 nm |
| SHG | 0.004 nm | 0.005 nm | 0.005 nm |

(Stability of 488 nm Output)

Figure 23:
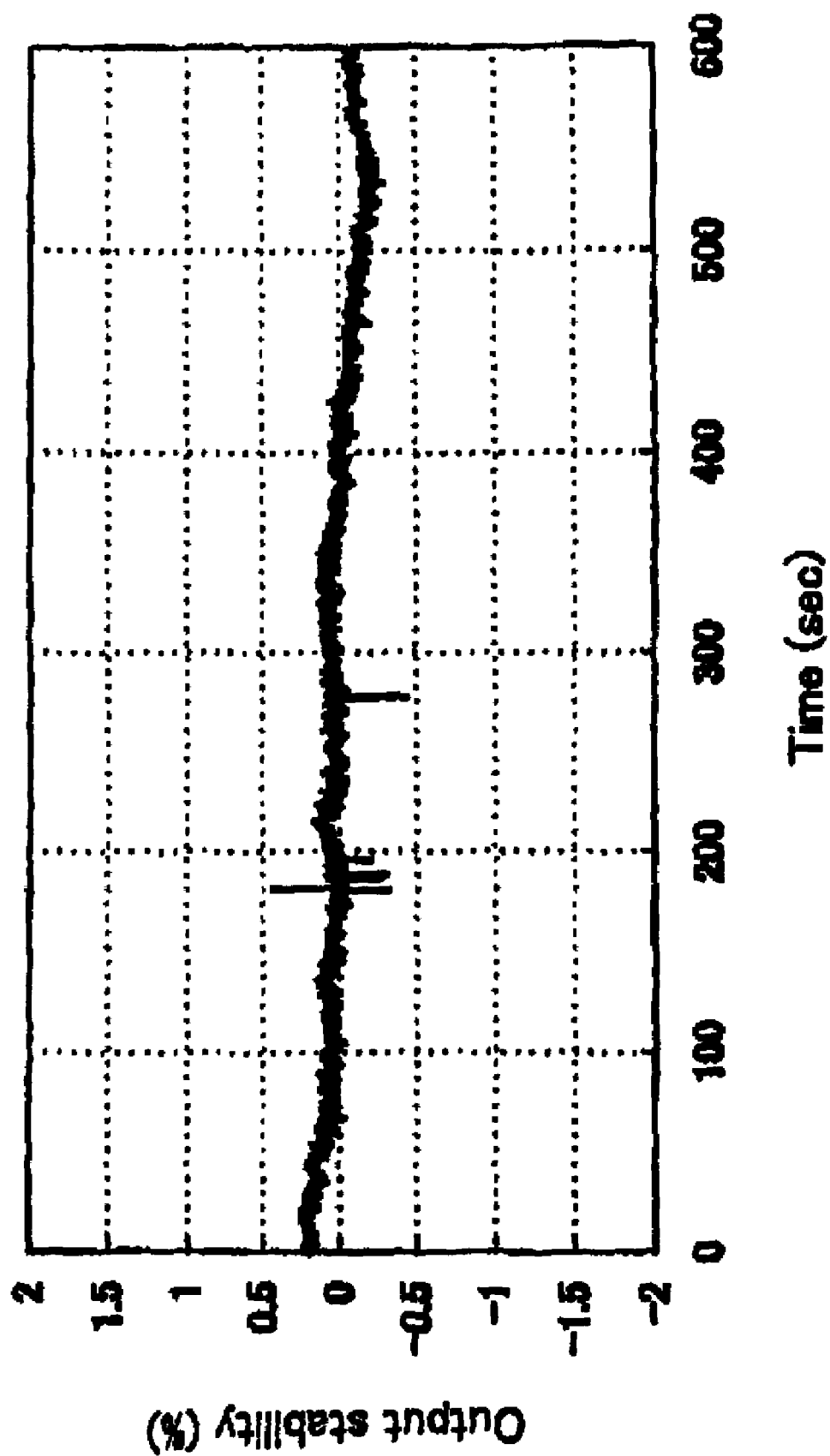
FIG. 23 is a view showing a stable oscillation state of the fundamental.

In the case of 976 nm LD without FBG, the oscillation state of its fundamental wave is unstable and varies as time varies. The unstable oscillation state of the fundamental wave is directly linked to the instability of 488 nm light output. Then, we monitored 488 nm power output from the PPLN and confirmed that by feedback processing to the LD controlling circuit the stability of an 488 nm light output falls within plus or minus 5%, as shown in FIG. 23. As that time, the wavelength stability of 488 nm light output was 0.07 nm or below.

(Comparison of With and Without FBG)

Figure 24:
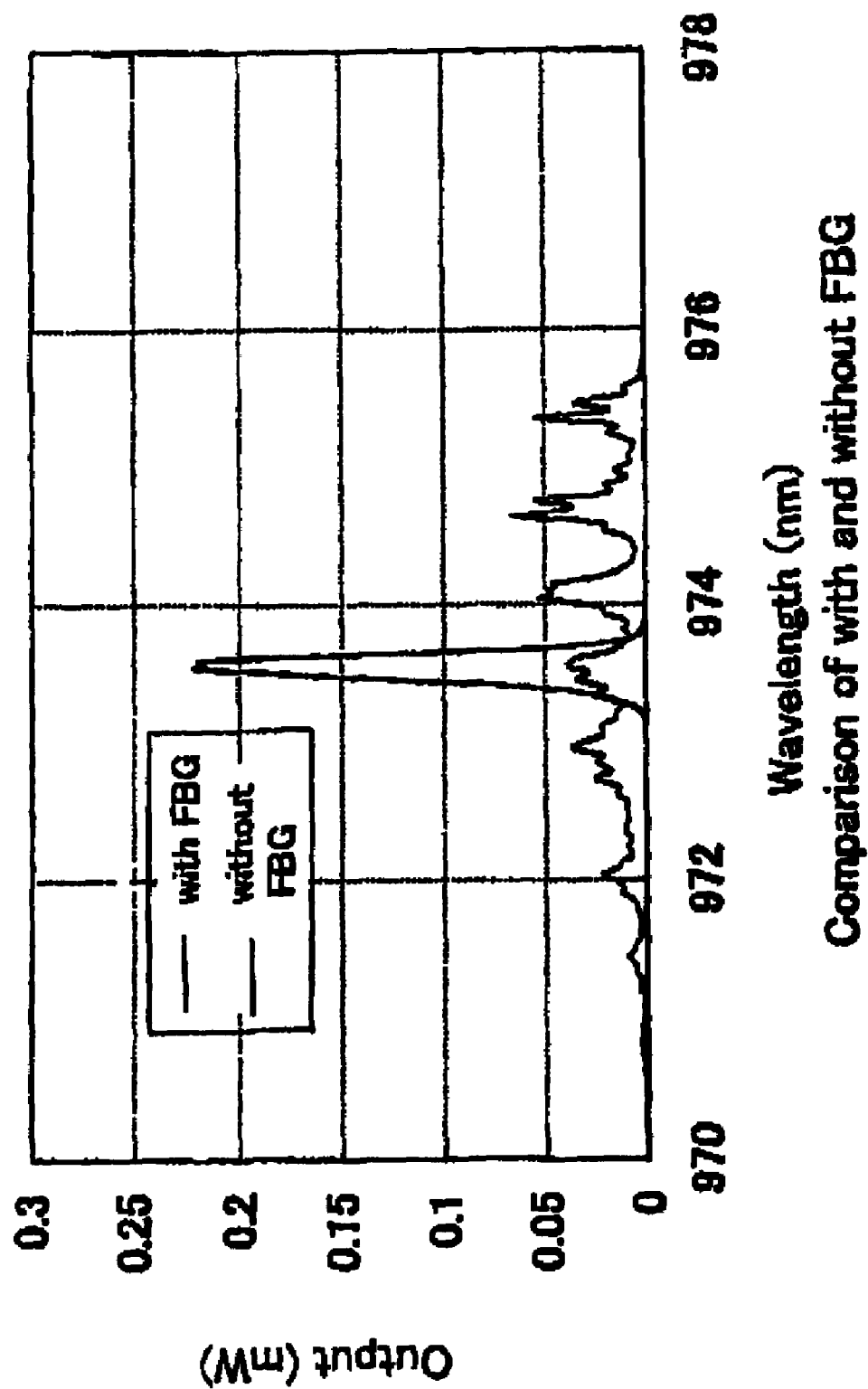
FIG. 24 is a view showing comparison of with and without FBG with the same LD for the fundamental.

As fundamental wave (see FIG. 24) the same LD is used to compare calculation values and experimental values of the FBG case with those of non-FBG case.

Figure 25:
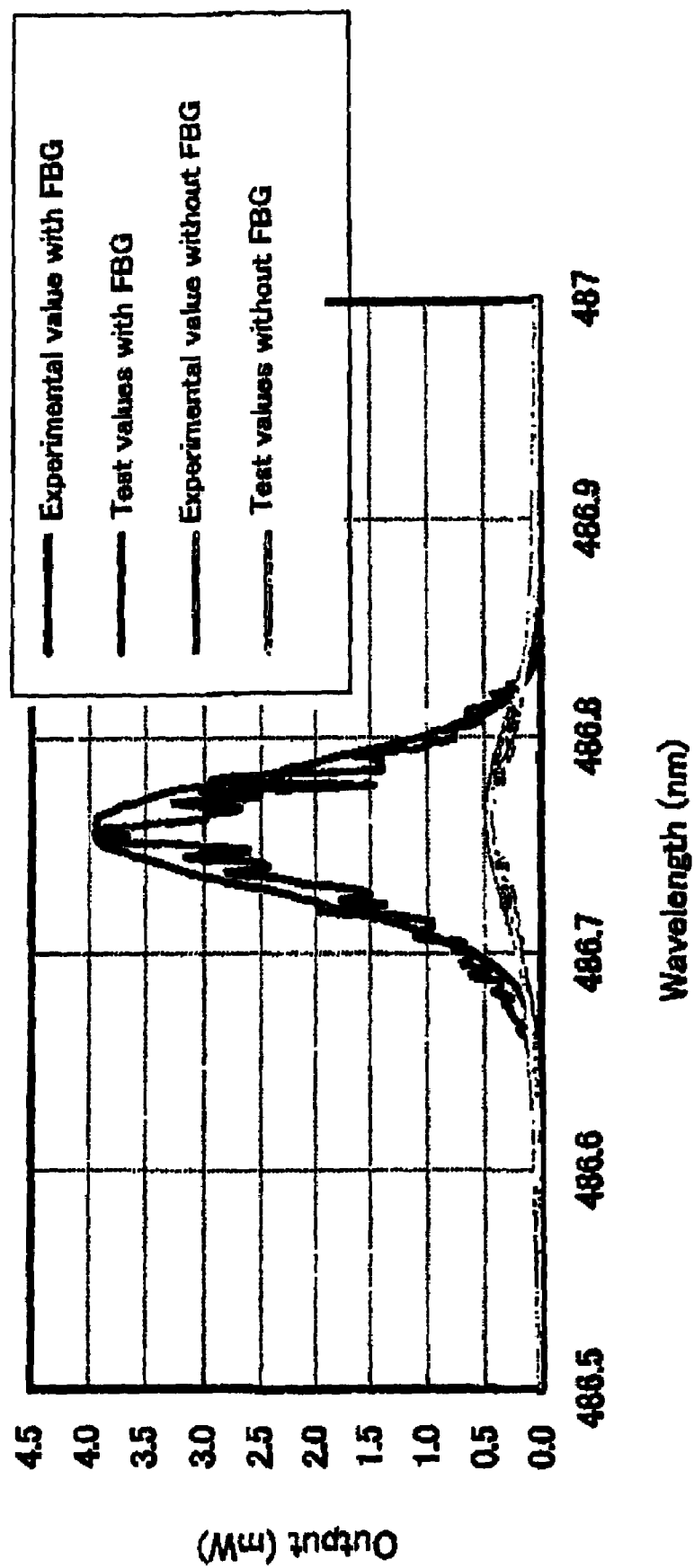
FIG. 25 is a view showing SFG calculation results based on the fundamentals with and without FBG.

Input power into the PPLN is 180 mW in the FBG case and 208 mW in the non FBG case. The peak power of the fundamental wave of the non-FBG case is one fourth of that of FBG case. This fundamental wave is used to carry out SFG calculation, which results are shown in FIG. 25.

TABLE 4

| | FWHM comparison | |
|---|---|---|
| | With FBG | Non FBG |
| Experiment | 0.066 nm | 0.111 mm |
| SFG | 0.069 nm | 0.102 nm |
| SHG | 0.005 nm | 0.004 nm |

As shown in Table 4, calculation results based on the SFG theory are identical to the experimental values regardless of the presence or absence of FBG. In addition, an experimental value of output power ratio (without FBG/with FBG) is 25% while a calculated value thereof is 27%, which means that calculation based on the SFG theory gives right values that agree with experimental values.

Accordingly, it has been proved that calculation results based on the SFG theory agree with experimental values for wide-band fundamental wave of an LD without FBG. It has been also proved that a 976 nm LD without FBG and a PPLN can be combined to provide a 488 nm blue laser of miniature size which has an output of 4 mW, output stability of within plus or minus 0.5% and wavelength stability of 0.07 nm.

(Power Monitor)

The following description is made about a power monitor applicable when an optical output is measured to perform feedback control.

According to an embodiment of the power monitor, the power monitor is configured to detect a leak of light from a PPLN. As approximately 10% of light from the PPLN is leaked, if a PD device is arranged in the vicinity of the PPLN to measure a light leak, it becomes possible to detect an output.

Further, according to another embodiment of the power monitor, a branch portion such as a coupler is arranged at the output side of the PPLN to branch given power (for example, a few percent of the whole output power) and a PD device is arranged at the end of this branched path thereby to detect an output.

Furthermore, according to another embodiment of the power monitor, a PD device may be arranged at a space coupling potion where a lens or the like is arranged at the PPLN output side so as to measure scattered light (light reflecting off a face of the lens) or the like.

Still furthermore, anterior to the PD device of the aforementioned embodiments, an optical filter for allowing only target light to pass through (or other light than the target light to reflect off) may be arranged. This configuration is applicable to all of the aforementioned embodiments.

(Application of Photonic Crystal Fiber)

In a wavelength conversion module of the present invention, a photonic crystal fiber (Foley fiber) can be used as an optical fiber.

A photonic crystal fiber is an optical fiber which is used by trapping light based on the principle of photonic band gap (PBG). More specifically, the photonic crystal fiber is an optical fiber that utilizes the PBG principle, in which light at a particular wavelength is allowed to pass through a medium which has almost the same periodic structure as light wavelength and relatively large change in reflective index while light at a different wavelength is not allowed to pass through and reflect off the medium.

Particularly, when this photonic crystal fiber is arranged at both of the input side and the output side of the PPLN, the photonic crystal fiber presents better optical coupling efficiency than a SMF. This is because the photonic crystal fiber presents more excellent photo sensitivity for light angle distribution in the PPLN.

As described up to now, the present invention makes it possible to stabilize an oscillation wavelength of a semiconductor laser module even when the driving current of the semiconductor laser device is changed, thereby providing an SHG laser module with a stable output or an SHG laser module with a constantly changed output.

Further, a semiconductor laser module and an SFG generating element are combined thereby making it possible to provide a wavelength multiplying module with a stable output.

Furthermore, it is possible to combine this wavelength multiplying module with an SHG generating element and a FBG as an external resonator, thereby providing stable outputs by various machine configuration.

The invention claimed is:

1. A wavelength conversion module comprising:
 a semiconductor laser module operating in a multi-longitudinal mode to generate light having a plurality of wavelengths;
 an external resonator coupled to the semiconductor laser module to output light having a plurality of resonant wavelengths;
 a first optical fiber coupled to the external resonator to propagate the light having the resonant wavelengths;
 a Sum-Frequency Generation (SFG) wavelength conversion device coupled to the first optical fiber to output light having a wavelength at a sum frequency of the resonant wavelengths;
 a temperature-controlling Peltier element on which the SFG wavelength conversion device is mounted;
 a second optical fiber coupled to the SFG wavelength conversion device to propagate the light having the wavelength at the sum frequency; and
 the SFG wavelength conversion device comprising a periodically poled lithium niobate (PPLN) waveguide.

2. The wavelength conversion module according to claim 1, wherein each of the first and second optical fibers comprises a polarization maintaining fiber.

3. The wavelength conversion module according to claim 1, wherein the external resonator comprises a fiber Bragg grating (FBG).

* * * * *